United States Patent [19]

Franklin

[11] 4,285,169

[45] Aug. 25, 1981

[54] METHOD OF USING VACUUM LIFTED BLADE SHARPENER FOR ROTARY MOWERS

[76] Inventor: Reginald T. Franklin, 714 Sherril, Orange, Tex. 77630

[21] Appl. No.: 21,889

[22] Filed: Mar. 19, 1979

[51] Int. Cl.³ .............................................. B24B 1/00
[52] U.S. Cl. ...................................... 51/288; 76/82.1; 51/211 R; 51/250
[58] Field of Search ............... 30/138; 51/204, 211 R, 51/161, 250, 262 R, 288; 76/82.1, 85

[56] References Cited

U.S. PATENT DOCUMENTS

| | | | |
|---|---|---|---|
| 970,619 | 9/1910 | Gardner | 51/204 |
| 2,826,032 | 3/1958 | Hayes . | |
| 3,101,629 | 8/1963 | Koelndorfer . | |
| 3,136,107 | 6/1964 | Spear . | |
| 3,225,527 | 12/1965 | Spear . | |
| 3,596,412 | 8/1971 | Brayman | 51/246 |
| 3,636,666 | 1/1972 | Brayman | 51/250 |
| 3,665,658 | 5/1972 | Warwick | 51/250 |
| 3,768,163 | 10/1973 | Weber | 51/250 X |
| 3,782,039 | 1/1974 | Warwick | 51/250 |

FOREIGN PATENT DOCUMENTS

215642 6/1968 U.S.S.R. .................................. 51/250

*Primary Examiner*—Gary L. Smith
*Attorney, Agent, or Firm*—Arnold, White & Durkee

[57] ABSTRACT

Method and apparatus are disclosed for sharpening the blade of a rotary mower. Sharpening is accomplished by utilizing the upward vacuuming action created by the rotation of the blade. At present blades having downwardly turned cutting edges and upwardly turned trailing edges have been found to create the requisite vacuum for the operation of the sharpening apparatus.

4 Claims, 5 Drawing Figures

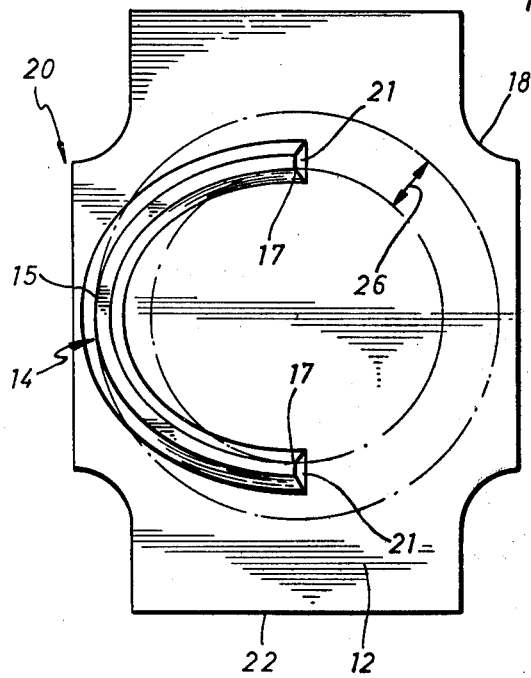
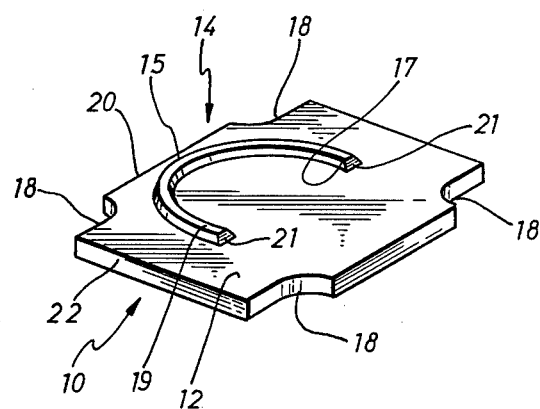
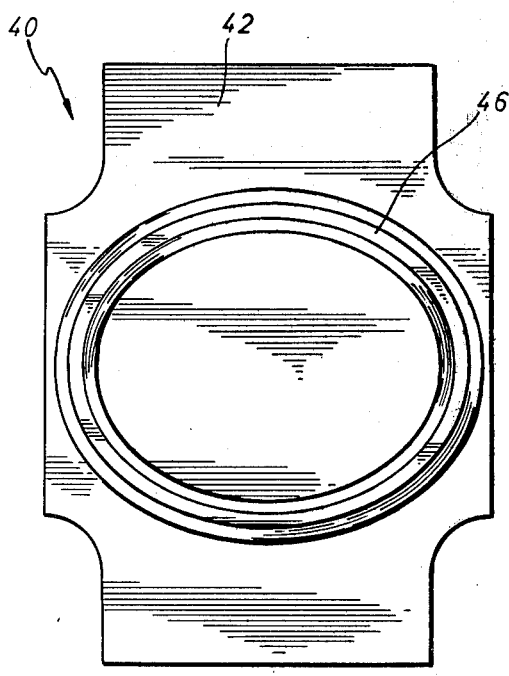
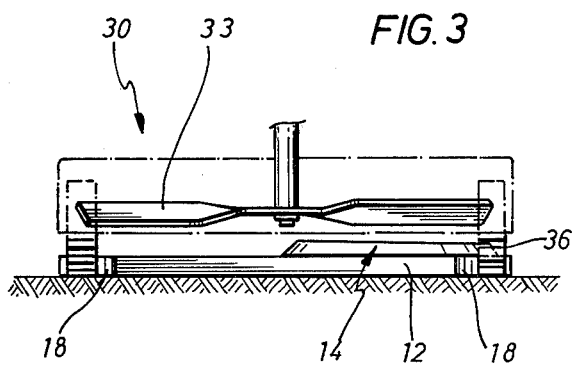
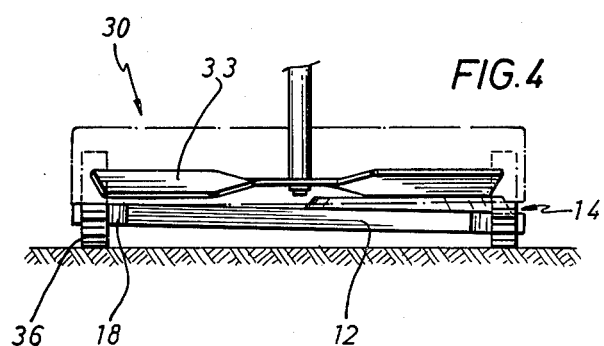

METHOD OF USING VACUUM LIFTED BLADE SHARPENER FOR ROTARY MOWERS

BACKGROUND OF THE INVENTION

1. Field of the Invention

The present invention relates to sharpening devices, and, more particularly, to devices for sharpening the blade of a rotary lawn mower without removing the blade from the mower.

2. Description of the Prior Art

There are several advantages to using a lawn mower with a sharp blade over a lawn mower with a dull blade. These advantages include higher quality of mowing, lower fuel consumption, and, for those rotary mowers which are not self propelled, less resistance to pushing.

One method of sharpening the blade of a lawn mower comprises the use of conventional bench-mounted grinding apparatus. With this method, the blade is removed from the mower, sharpened and then replaced on the mower. The adequacy of sharpening using the above method may be determined by mowing a small portion of grass, and, of course, if the sharpening is inadequate, the time consuming process described above must be repeated. Accordingly, it is desirable both in terms of time and effort to sharpen the blade of a lawn mower without removing it from the mower.

Various techniques have been proposed to accomplish the sharpening of the blade "in situ". For example, in U.S. Pat. Nos. 3,136,107 and 3,225,527 to Spear, sharpening apparatus are disclosed which are mounted on the housing of the mower. In U.S. Pat. No. 3,596,412, Brayman states that these arrangements have disadvantages in that the size of the mower housing must be increased to incorporate the sharpener and that there is difficulty in inspecting the blade to determine if it has been adequately sharpened.

U.S. Pat. No. 3,596,412 to Brayman discloses an apparatus having a base and sharpener mounted for an up and down movement with respect to the base. Brayman states that, as the lawn mower is pushed onto the base, the housing of the lawn mower engages a pusher which, via a turnbuckle arrangement, raises a grinding stone into contact with the blade of the mower. The apparatus disclosed by Brayman appears to be somewhat complex in construction.

Another type of sharpening apparatus is disclosed in U.S. Pat. No. 3,665,658 to Warwick. This apparatus comprises a resiliently deformable body portion provided with an upper abrasive surface. The apparatus is designed to be placed on a level surface, e.g., the ground, and the housing of the lawn mower whose blade is to be sharpened is placed over the apparatus. The blade of the lawn mower thus comes into contact with the sharpening device due to the thickness of the foam. Warwick states that the blade may be sharpened by causing momentary rotations of the blade. Since the device disclosed by Warwick is not designed to sharpen a blade which is continuously rotating, it is believed it would take significantly longer and be a significantly more arduous process to sharpen the blade using the Warwick device than using other devices heretofore discussed.

SUMMARY OF THE INVENTION

In accordance with the present invention, a device is provided for sharpening the blade of a rotary mower while the mower is operating. The device is raised by the vacuum created by the operation of the mower to permit contact between the device and the blade.

In one embodiment, the sharpening device includes a base of suitable weight to accommodate the raising of the sharpener into contact with the blade by the vacuum created by the rotating blade. The sharpener further includes a length of upraised grinding medium secured to the planar base.

In one specific embodiment, the base includes a flat planar material, essentially rectangular in shape, and of length and width greater than the housing of the mower. Side cutouts are made at the corners and sides of the base, the cutouts being of sufficient length and width to accommodate the proper positioning of the mower over the sharpener. The dimension of the cutouts should be such that there is unrestricted upward movement of the sharpener to the blade and no rotation of the sharpener in the mower housing during sharpening.

In accordance with the present invention, a method of sharpening the blade of a rotary mower is also provided. This method includes placing the sharpening device on a substantially level surface, i.e., the ground, and positioning the rotary mower over the sharpening device. The mower is then started, and the rotating blade creates an upward vacuum on the sharpening device. The sharpening device is thus raised into contact with the blade, and the rotational speed of the blade is maintained for successive revolutions in order to maintain a grinding pressure between the blade and the sharpening device and accommodate sharpening of the blade. Thereafter, the rotational speed of the blade is decreased in order to diminish the upward suction so that the sharpening device is lowered to the level surface.

In a specific embodiment of the present method, the sharpening device includes a planar base and a length of upraised grinding medium secured to the planar base. The method is then characterized during the sharpening of the blade by repeatedly contacting the cutting edge of the blade with the top of the upraised grinding medium.

In a more specific embodiment of the present method, the sharpening device includes a flat planar base with length and width of greater dimension than the respective length and width of the mower housing. The base further has cutouts from its corners and sides corresponding to the positioning of the wheels on the mower housing in order to provide space for the wheels during operation. The method is then characterized by positioning the wheels in the respective cutouts so that the rotary mower is positioned over the sharpening device. The extended length and width of the base then prevent rotation of the sharpening device during the raising of the sharpening device into contact with the blade and during the sharpening of the blade.

With the method of the present invention, the rate of sharpening the blade may be varied. In one embodiment, this is accomplished by varying the rotational speed of the blade in order to vary the upward vacuum force on the sharpening device and the grinding pressure thereby. In another embodiment, the rate of sharpening may be varied by varying the surface area of the top of the grinding medium, thereby inversely varying the grinding pressure.

BRIEF DESCRIPTION OF THE DRAWINGS

In the accompanying drawings:

FIG. 1 is a perspective view of one embodiment of a blade sharpening device in accordance with the present invention.

FIG. 2 is a top view of the device illustrated in FIG. 1.

FIG. 3 is an end view of the sharpening device of FIG. 1 with a lawn mower in position prior to starting the mower.

FIG. 4 is an end view of the sharpening device of FIG. 1, which illustrates the sharpening device raised into position by the rotation of the blade of the lawn mower.

FIG. 5 is a top view of another embodiment of a sharpening device in accordance with the present invention.

DESCRIPTION OF SPECIFIC EMBODIMENTS

It will be appreciated that the present invention can take many forms and embodiments. Some embodiments of the invention are described so as to give an understanding of the invention. It is not intended, however, that the illustrative embodiments herein described should in any way limit the true scope and spirit of the invention.

Referring now to FIG. 1, sharpening device 10 comprises base 12 and grinding medium 14. Base 12 comprises an essentially flat, rectangular member of length 20 and width 22. Length 20 and width 22 should be of greater dimension than the respective length and width of the housing of the lawn mower to be sharpened. In the preferred embodiment, the length 20 exceeds the length of the mower housing by six inches and the width 22 exceeds the housing width by two inches.

Four arcuate cutouts 18 are made in base 10, each said cutout being located at a corner of base 12. Cutouts 18 accommodate the positioning of the mower prior to sharpening and accommodate the upward movement of the sharpening device, unrestricted by the wheels of the mower. Cutouts 18 further prevent rotation of the sharpening device, upon sharpening. The exact shape of cutouts 18 is not critical, so long as they are of sufficient dimension to accommodate the proper positioning of the mower and the unrestricted upward movement of the base to the lawn mower housing upon sharpening. Further, the location of the cutouts should be determined by the location of the wheels on the mower housing of the lawn mower to be sharpened.

Referring to FIGS. 1 and 2, the illustrated embodiment of the sharpener also comprises grinding medium 14. The composition of grinding medium 14 comprises the following components: about 80% by weight of a stone material, e.g. sandstone, granite or the like, which is crushed to a particle size of 1/16" to ⅛"; about 1% by weight of sand; and about 19% by weight of a bonding material, such as a polyester bonding resin, epoxy resin or cement. These components are mixed together until each particle of stone material and sand is coated with the bonding resin, and the mixture is then adhesively bonded to base 12 in the appropriate location described by the concentric circles circumscribed by the rotation of the cutting edge as described below.

It has been found that a grinding medium fabricated from the above-identified material has shock-absorbing characteristics. Accordingly, the risk of damage to a blade with a grinding medium so fabricated is minimized. Further, it has been found that the quantities of components comprising the composition of the grinding medium may be varied to some extent, without loss of sharpening efficiency.

Referring to FIG. 1, grinding medium 14 is illustrated to be approximately ½ inch in height and comprises a substantially flat top 19 and outwardly tapering sides and ends 21. In one embodiment, the width of the top 19 is approximately ½ inch, but this width may be varied in order to vary grinding surface area, thereby varying grinding pressure upon sharpening.

Referring to FIG. 2, the configuration of the top 19 of grinding medium 14 is defined roughly by a parabola of substantially constant width having an apex 15 located at a distance from the center of rotation of the blade essentially equal to one-half the entire length of the blade, such distance being essentially equal to the radius of the outermost circle described by the rotation of the tip of the blade. The inner edge points 17 of the ends of the parabola are located at a distance from the center of rotation of the blade essentially equal to one-half the length between the innermost points of the cutting edges at each end of the blade, such distance being essentially equal to the radius of the circle described by the rotation of the innermost points of the two cutting edges of the blade. Hence, the configuration of the grinding medium 14 has a radial dimension 26, measured on a radius of rotation of the blade, substantially equal to the length of the cutting edges of a blade, such dimension being suitable to accommodate sharpening of conventional rotary mower blades having cutting edges of equal length at each end of the blade.

In operation, the sharpening device is placed on a substantially level, planar surface. Mower 30 is then positioned over the sharpening device with wheels 36 located in the corresponding cutouts 18, as illustrated in FIG. 3. Mower 30 is then started, and a vacuum is created by the rotation of blade 33. That vacuum raises sharpening device 10 and grinding medium 14 contacts blade 33, as illustrated in FIG. 4. Blade 33 is then sharpened by maintaining the rotational speed of the mower at a level such that a grinding pressure exists between blade 33 and grinding medium 14 for repeated revolutions. When it is believed that blade 33 is adequately sharpened, sharpening device 10 is lowered by decreasing the rotational speed of blade 33.

From the foregoing, it is seen that base 12 must be constructed of a material of suitable weight such that it can be raised into contact with the blade by the vacuum created by the rotating blade. In other words, the force created by the vacuum must exceed the force exerted on base 12 by gravity. In one embodiment, ¼ inch to ⅜ inch plywood is utilized for base 12, but it should be apparent to those of skill in the art that other material of suitable weight and strength may also be used.

The rate of sharpening a blade utilizing the sharpening apparatus may be changed by increasing or decreasing the grinding pressure. This change may be effected by varying the speed of the mower. Alternatively, the change may be effected by varying the surface area of top 19 of grinding medium 14.

FIG. 5 illustrates an alternative embodiment of the sharpening device. In this embodiment, sharpening device 40 includes base 42, which is similar to base 12 of FIGS. 1 through 4. Sharpening device 40 further includes grinding medium 46 of composition similar to that described for grinding medium 14 of FIGS. 1–4. Grinding medium 46 comprises a single oval with the top having a width of approximately ½ inch and a radial dimension essentially equal to the radial dimension of the cutting edge of the blade as described earlier. Grinding medium 46 further includes outwardly tapering sides similar to those illustrated for the embodiment illustrated in FIGS. 1 through 4.

The method of operation of this embodiment, then, is essentially identical to that described for the embodiment of FIGS. 1-4.

From the foregoing, it will be apparent to those skilled in the art that variations of the illustrated embodiments may be made without departing from the spirit and scope of the invention. For example, the base portion of the sharpener could be constructed such that its dimensions only exceed either the width or the length of the mower housing with suitable vertical stops included to prevent linear and rotational movement of the base upon sharpening. Additionally, the grinding media can take any shape so long as the radial dimension of the grinding medium equals or exceeds the radial dimension defined by the cutting edge of the blade to be sharpened. Further variations would include varying the location of the cutouts to correspond with the varying locations of wheels of selected mowers. These and other variations would be apparent to those skilled in the art and are within the spirit and scope of the invention.

What is claimed is:

1. A method of sharpening a blade of a rotary mower, comprising the steps of:
    (a) placing a sharpening device on a level surface;
    (b) positioning the rotary mower over the sharpening device;
    (c) operating the mower at a sufficient speed to raise the sharpening device by vacuum force to sharpen the blade; and
    (d) decreasing the speed of the mower to lower the sharpening device.

2. The method of claim 1, wherein said sharpening device includes a planar base and an upraised grinding medium secured to the planar base, which grinding medium contacts the blade of the mower.

3. The method of claim 1, wherein said base is prevented from rotating during the sharpening operation.

4. The method of claim 1, wherein it further comprises varying the rotational speed of the blade to vary the rate of sharpening of the blade.

* * * * *